Nov. 25, 1930.　　　　B. P. JOYCE　　　　1,782,656

PACKING

Filed Sept. 23, 1927

INVENTOR

Bryan P. Joyce

Patented Nov. 25, 1930

1,782,656

UNITED STATES PATENT OFFICE

BRYAN P. JOYCE, OF DAVENPORT, IOWA

PACKING

Application filed September 23, 1927. Serial No. 221,549.

My invention has reference, in general, to packing, and more particularly it relates to a packing embodying a fluid seal.

The principal object of my invention is to utilize the pressure of the sealing fluid to counteract the thrust of the part packed, whether such thrust is due to operation of the machine, due to weight of the machine parts or a combination of both. Another object of my invention is to provide a simple, compact and efficient rotary pump; and such further objects, advantages and capabilities as will hereafter appear and as are inherent in the construction disclosed herein. My invention further resides in the combination, construction and arrangement of parts illustrated in the accompanying drawing, and, while I have disclosed therein what is now considered the preferred form of this invention, I desire it understood that the present disclosure is to be considered as illustrative only and not as limiting my invention.

Figure 1:
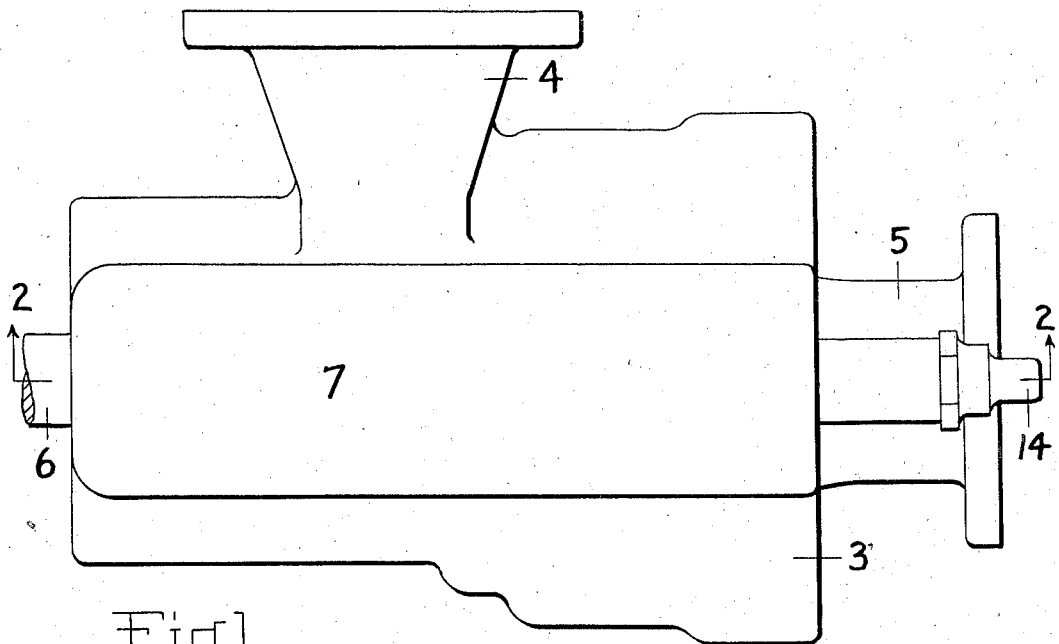
Figure 2:
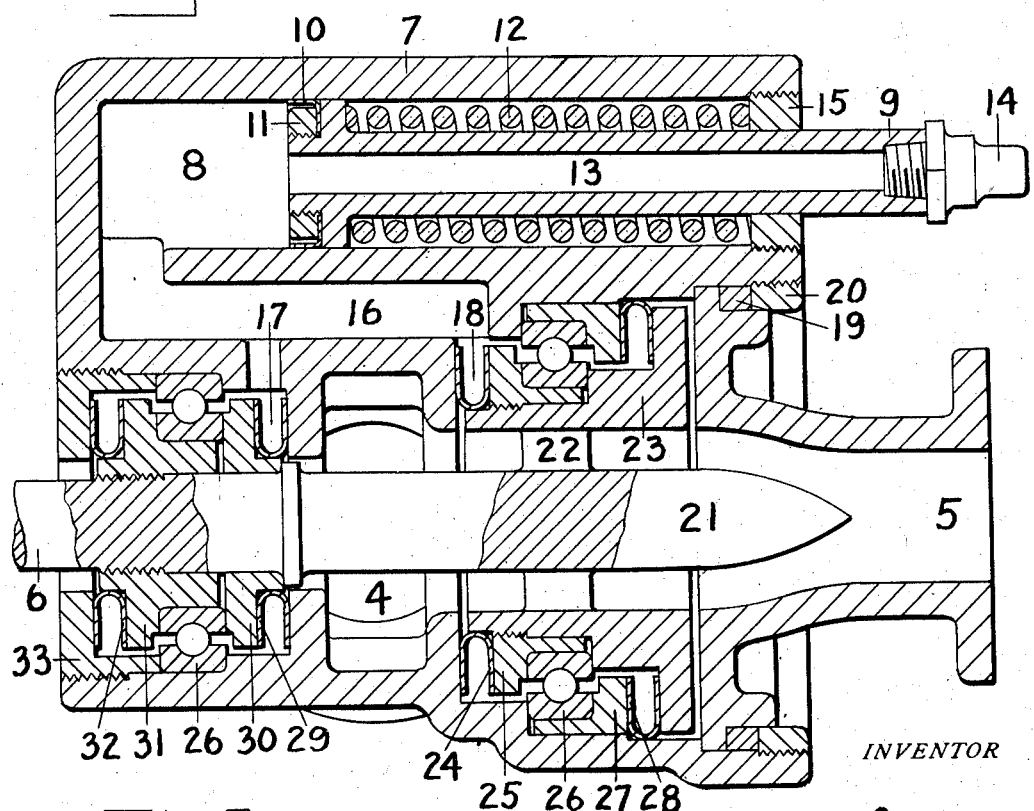

In the drawings annexed hereto and forming a part hereof, Fig. 1 shows a plan view of a rotary pump; Fig. 2 is a sectional view on the line 2—2 of Fig. 1.

Referring more in detail to the annexed drawings, 3 designates a pump casing with inlet 4 and discharge 5. The casing also includes the cylinder 7 in which the piston 9 is mounted, the piston being packed by the ring 10 held in place by the nut 11, actuated by the helical spring 12 and supported at one end by the ring 15. Sealing fluid is admitted to the chambers 8, 16, 17 and 18 through the valve 14 and the hole 13, the spring 12 maintaining said fluid under pressure. The rotor 21 driven by the shaft 6 is mounted in the casing 3 by means of the radial thrust bearings 26. The inner races of these bearings are clamped to the rotor by means of the parts 31, 30 and 25, 23, their outer races contacting the parts 33, 27 and the casing 3. The packing rings 32, 29 and 24, 28 seal the fluid chambers 17 and 18, these rings being of thin resilient flexible metal and maintained in sealing contact by the pressure of the sealing fluid, as fully explained in certain of my copending applications. The rotor 21 is provided with suitable vanes 22 and the discharge 5 is packed by the ring 19 (see applicant's Patent 1,635,482) secured by the ring 20.

The sealing fluid within the chamber 18 acts upon the rotor as at 23 tending to force it toward the discharge 5 while the reaction of the rotor due to operation and pressure is opposite; also should the pump be operated in a vertical position, with the shaft 6 depending, the weight of the rotor would increase said reaction. The strength of the spring 12 and the area of the piston 9 are so adjusted that the pressure of the sealing fluid upon the rotor at 23 balances the thrust of the rotor and very little thrust is taken by the bearings 26. The differential pressure means disclosed in my Patent No. 1,721,737, dated July 23, 1929, may be used in place of the piston 9 if desired. As illustrated, the sealing fluid within the chamber 17 exerts no thrust upon the rotor as the areas are equal and the pressure is balanced. The area of the rotor subject to thrust of the sealing fluid is smaller than the area of the rotor subject to thrust of the fluid pumped and, therefore, the unit pressure of the sealing fluid is greater than that of the fluid pumped. Consequently, there is no leakage of the pumped fluid by the packing.

While I have disclosed this invention as used in connection with a pump, it will be understood that it may be used in various other situations, as, for example, floating the rotating element of turbo-generators, and numerous other uses coming within the scope of the appended claims.

Having now described my invention, I claim:

1. A packing between relatively movable parts of a pressure fluid machine, said packing comprising a chamber formed between said parts by metal packing rings and full of fluid under greater pressure than the machine fluid, a bearing within said chamber, means securing the bearing in position within the chamber and between the machine parts, and one of the machine parts exposing a greater area to the pressure of the packing fluid in one direction than in the opposite direction, to relieve said bearing of load when the machine is in operation.

2. In a rotary pump including a casing and a rotor mounted therein, a packing between the casing and the rotor, said packing comprising a chamber formed between the pump parts by packing rings and full of fluid under greater pressure than the pump fluid, and the rotor exposing a greater area to the pressure of the packing fluid in one direction than in the opposite direction, to permit the pressure of the packing fluid to oppose the thrust of the rotor.

3. In a pressure fluid machine including a casing and a rotor mounted therein, a packing between the casing and the rotor, said packing comprising a chamber formed between the casing and rotor by packing rings and full of fluid under greater pressure than the machine fluid, the rotor exposing a greater area to the pressure of the packing fluid in one direction than in the opposite direction, to permit the pressure of the packing fluid to oppose the thrust of the rotor and automatic means to maintain packing fluid under pressure within the packing chamber.

4. A packing between relatively rotatable parts of a pressure fluid machine, said packing comprising packing rings mounted between said parts to form a chamber between them and said chamber being full of fluid under greater pressure than the machine fluid, a piston mounted within one of the machine parts to form a chamber within the part and adjacent the packing, said machine chamber being full of packing fluid and in open communication with the packing chamber, resilient means adapted to cooperate with said piston to maintain the packing fluid under pressure and the machine rotor exposing a greater area to the pressure of the packing fluid in one direction than in the opposite direction to permit the packing fluid pressure to oppose the thrust of said rotor when the machine is in operation.

5. A packing between the casing and the rotor of a pressure fluid machine, said packing comprising packing rings mounted between the casing and rotor to form a chamber between them and said chamber being full of fluid under greater pressure than the machine fluid, a bearing mounted within the chamber between the casing and the rotor, means within one of the machine parts forming a chamber within the part and adjacent the packing, said machine chamber being full of packing fluid and in open communication with the packing chamber, said means being adapted to maintain the packing fluid under pressure and the machine rotor exposing a greater area to the pressure of the packing fluid in one direction than in the opposite direction to permit the packing fluid pressure to oppose the thrust of said rotor, to relieve said bearing of rotor thrust when the machine is in operation.

In witness whereof, I hereunto subscribe my name to this specification.

BRYAN P. JOYCE.